United States Patent [19]
Blough et al.

[11] Patent Number: 6,148,641
[45] Date of Patent: Nov. 21, 2000

[54] APPARATUS AND METHOD FOR PRODUCING DRIED, CHOPPED STRANDS

[75] Inventors: John R. Blough, Gastonia; Jerry B. Noftsger; Ronald L. Hawkins, both of Shelby, all of N.C.

[73] Assignee: PPG Industries Ohio, Inc., Cleveland, Ohio

[21] Appl. No.: 09/215,485

[22] Filed: Dec. 18, 1998

[51] Int. Cl.$^7$ .................................................. C03C 25/02
[52] U.S. Cl. ............................... 65/529; 65/530; 65/536; 65/507; 65/480; 65/452; 264/145; 264/149; 264/211.17; 264/DIG. 19; 425/6; 427/444; 427/464; 427/348; 427/354; 427/356; 427/372.2; 118/606; 118/58
[58] Field of Search ............................ 65/426, 433, 452, 65/480, 505, 507, 510, 529, 530, 536; 264/5, 145, 149, 211.17, DIG. 19; 425/6; 427/348, 354, 356, 372.2, 464, 444; 19/0.27, 0.6, 0.62; 118/36, 58, 606

[56] References Cited

U.S. PATENT DOCUMENTS

| | | |
|---|---|---|
| 3,596,319 | 8/1971 | McKenica et al. . |
| 3,901,675 | 8/1975 | Buchanan et al. . |
| 3,996,032 | 12/1976 | McWilliams et al. . |
| 4,022,560 | 5/1977 | Heionen .................................. 425/317 |
| 4,840,755 | 6/1989 | Nakazawa et al. . |
| 5,267,845 | 12/1993 | Anderlind et al. . |
| 5,582,786 | 12/1996 | Brunskill et al. . |

FOREIGN PATENT DOCUMENTS

| | | |
|---|---|---|
| 0 080 593 | 6/1983 | European Pat. Off. . |
| 62-138341 | 6/1987 | Japan . |
| 4-16438 | 10/1990 | Japan . |
| 4-164838 | 6/1992 | Japan . |

OTHER PUBLICATIONS

Lowenstein, "The Manufacturing Technology of Continuous Glass Fibres", pp. 297–298, 1983.
*The Manufacturing Technology of Glass Fibres*, by K. L. Loewenstein (3rd Ed 1993) pp. 237–289.
*The Manufacturing Technology of Glass Fibres*, by K. L. Loewentstein (3rd Ed 1993) p. 27.
*Encyclopedia of Polymer Science and Technology*, vol. 6, pp. 505–712.
*The Manufacturing Technology of Glass Fibres*, by K. L. Loewenstein (3rd Ed 1993) pp. 31–36.
*The Manufacturing Technology of Glass Fibres*, by K. L. Loewenstein (3rd Ed 1993) p. 325.

*Primary Examiner*—Stanley S. Silverman
*Assistant Examiner*—Michael P. Colaianni
*Attorney, Agent, or Firm*—Andrew C. Siminerio

[57] ABSTRACT

An apparatus and method for producing dried, chopped strands from a supply of continuous fiber strands by the direct deposition of wet, chopped strands ejected from a chopping assembly into a drying chamber is disclosed. A transition chute is interposed between the chopping assembly and the drying chamber to guide the chopped strands to pass directly into the drying chamber.

27 Claims, 5 Drawing Sheets

APPARATUS AND METHOD FOR PRODUCING DRIED, CHOPPED STRANDS

FIELD OF THE INVENTION

The present invention relates to an apparatus and method for producing dried, chopped strands from a supply of generally continuous fiber strands and, more particularly, to an apparatus and method for producing dried, chopped strands by the direct deposition of chopped strands into a drying chamber.

BACKGROUND OF THE INVENTION

Chopped, glass fiber strands are typically manufactured by either direct or indirect processing operations. Direct processing operations (or "direct-chop" operations) involve feeding a generally continuous, glass fiber strand directly from a fiber forming assembly into a chopping assembly where the strand is chopped. Indirect processing operations involve winding a generally continuous fiber strand onto a tube to form a package and subsequently feeding the generally continuous strand from the package into a chopping assembly. Packages of generally continuous fiber strand can also undergo additional processing steps, such as roving wherein multiple packages are combined into one package, prior to being chopped. Since direct processing of generally continuous fiber strands into chopped fiber strands reduces manufacturing costs by eliminating unnecessary processing and handling steps, it is often the preferred manufacturing route.

In direct-chop operations, a plurality of generally continuous, individual glass filaments are drawn from a fiber forming apparatus, such as a heated metal bushing or spinneret, and bundled together by a gathering device to form a generally continuous fiber strand. Before bundling the filaments together, a coating composition or sizing is applied to at least a portion of the surface of the individual filaments to protect them from abrasion. As used herein, "sizing" or "size" refers to a coating composition applied to the filaments immediately after forming. Such compositions are well known to those skilled in the art and are disclosed in K. Loewenstein, *The Manufacturing Technology of Glass Fibers,* (3rd. Ed. 1993) at pages 237–289, which are hereby incorporated by reference. After bundling, the generally continuous fiber strand is chopped to form a plurality of discrete, chopped strands. These wet chopped strands are then processed through a dying oven to at least partially dry the size on the surfaces thereof.

Transferring the wet, chopped strands to a drying oven can be done by collecting the chopped strands in a container or tote immediately after chopping and transporting the totes to a drying oven. This process is undesirable, however, due to the labor and handling associated with moving the totes. Furthermore, agglomeration or sticking of the wet, chopped strands can occur due to contact between strands having undried size on at least a portion of their surfaces.

An alternative method of transporting wet, chopped strands to a drying oven involves the use of a conveyance system, such as a conveyor belt. In this method, immediately after chopping, the wet strands are deposited directly onto a conveyor belt which transports them to a drying oven. While this method reduces the labor and handling associated with the use of totes, it does not eliminate the agglomeration concerns. Additionally, adherence of the wet, chopped strands to components of the conveyance system, such as the conveyor belt, can occur.

Agglomeration or sticking of the wet, chopped strands to each other and/or the equipment is undesirable because the strand bundles tend to break apart or filamentize when the strands are finally separated. Filamentization or breakage of the strand bundles is detrimental to the processing and handling characteristics of the strands in subsequent processing operations, such as but not limited to compounding and molding. Additionally, the properties of final products, such as reinforced plastic articles made using the strands, can be adversely affected.

As discussed below, several patents have been directed toward improving chopped strand manufacture operations and the quality of the product produced therefrom.

U.S. Pat. No. 3,996,032 discloses the use of a series of vibrating conveyor belts in the manufacture of chopped strands. After being chopped, strands fall onto a first vibrating conveyor which agitates the chopped strands (col. 2, lines 52–56). Subsequently, the strands are passed to a second vibrating conveyor having an amplitude of vibration less then that of the first conveyor (col. 2, lines 59–62). The second conveyor has a heating zone associated therewith to reduce the moisture content of the chopped strands (col. 2, 62–67).

U.S. Pat. No. 4,840,755 discloses the use of a spheroidizing or rolling apparatus to form chopped strands having a rod-like shape. Chopped strands formed by a cutting device are dropped onto a spheroidizing plate and subjected to a rolling action by a vibrating plate (col. 5, lines 42–45). The rolling action causes rounding and compacting of the strands into a rod-like shapes (col. 6, lines 26–31). After rolling, the strands are transferred to a drying station, either directly through an opening in the rolling apparatus or indirectly by means of a transfer device (col. 5, lines 27–30).

Japanese Kokai Application No. H4-164838 discloses the use of a vibrating conveyance device to transport wet, chopped strands from a cutter to a dryer. After being cut, the wet, chopped strands fall onto a vibrating conveyor attached at an angle to the intake mouth of a dryer and are fed to the dryer without accumulation or adherence of the strands to the conveyor. (page 4, paragraphs 3–4).

The foregoing references, however, do not provide a means for manufacturing dried, chopped strands that eliminates the need for external conveyance systems while improving product quality and reducing labor and equipment costs.

SUMMARY OF THE INVENTION

One aspect of the present invention is an apparatus for producing dried, chopped strands from a supply of generally continuous fiber strands, the apparatus comprising: (a) a chopping assembly for severing one or more generally continuous fiber strands to form chopped strands and ejecting the chopped strands from an exit opening thereof; (b) a drying chamber for receiving the chopped strands ejected from the exit opening of the chopping assembly and at least partially drying the chopped strands; and (c) a transition chute interposed between the exit opening of the chopping assembly and an entrance opening of the drying chamber such that at least one of the chopped strands ejected from the chopping assembly is guided to pass directly into the drying chamber.

Another aspect of the present invention is an apparatus for producing dried, chopped strands from a supply of generally continuous fiber strands, the apparatus comprising: (a) a chopping assembly for severing one or more generally continuous fiber strands to form chopped strands and ejecting the chopped strands from an exit opening thereof; and (b) a drying chamber for at least partially drying the chopped strands ejected from the chopping assembly positioned adjacent to the chopping assembly such that an entrance opening of the drying chamber is adjacent to the exit opening of the chopping assembly to permit the direct deposition of at least one of the chopped strands ejected from the chopping assembly into the drying chamber.

Yet another aspect of the present invention is a method of forming dried, chopped strands from a one or more generally continuous fiber strands comprising the steps of: (a) providing one or more generally continuous fiber strands to a chopping assembly; (b) feeding the one or more generally continuous fiber strands into the chopping assembly; (c) severing the one or more generally continuous fiber strands to form chopped strands; (d) ejecting the chopped strands from an exit opening of the chopping assembly such that at least one of the chopped strands passes through a transition chute and directly into a drying chamber; (e) collecting the chopped strands in the drying chamber; and (f) at least partially drying the chopped strands in the drying chamber.

BRIEF DESCRIPTION OF THE DRAWINGS

The foregoing summary and the following detailed description of the preferred embodiments will be better understood when read in conjunction with the appended drawings. In the drawings.

DETAILED DESCRIPTION OF THE PREFERRED EMBODIMENTS

The apparatus and method of the present invention are particularly advantageous in eliminating the undesirable agglomeration or sticking of wet, chopped glass fiber strands to each other or to conveyance equipment generally associated with conventional fiber chopping operations involving wet, generally continuous fiber strands. The claimed apparatus and method for producing dried, chopped strands by the direct deposition of wet chopped strands into a dying oven or chamber eliminates the need for strand conveyance systems between the chopping assembly and the drying oven, increases the efficiency of the manufacturing operation, eliminates processing steps, reduces handling, labor and equipment costs, and can improve the quality of the final chopped strand product. As used herein the term "wet, chopped strands" refers to chopped strands prior to drying having an at least partially undried sizing composition, secondary coating or lubricant on at least a portion of their surfaces. As used herein the term "secondary coating" means any coating composition applied to at least a portion of the surface of a fiber strand after a sizing composition has been applied thereto. The composition of the secondary coating can be the same as that of the sizing composition applied to the fiber strand or it can have a different composition. As used herein the term "different composition" means that the secondary coating composition applied to at least a portion of the surface of the fiber strands contains at least one component not present in the sizing composition applied to thereto or that at least one component of the secondary coating composition is present an amount different from the same component in the sizing composition.

Figure 1:
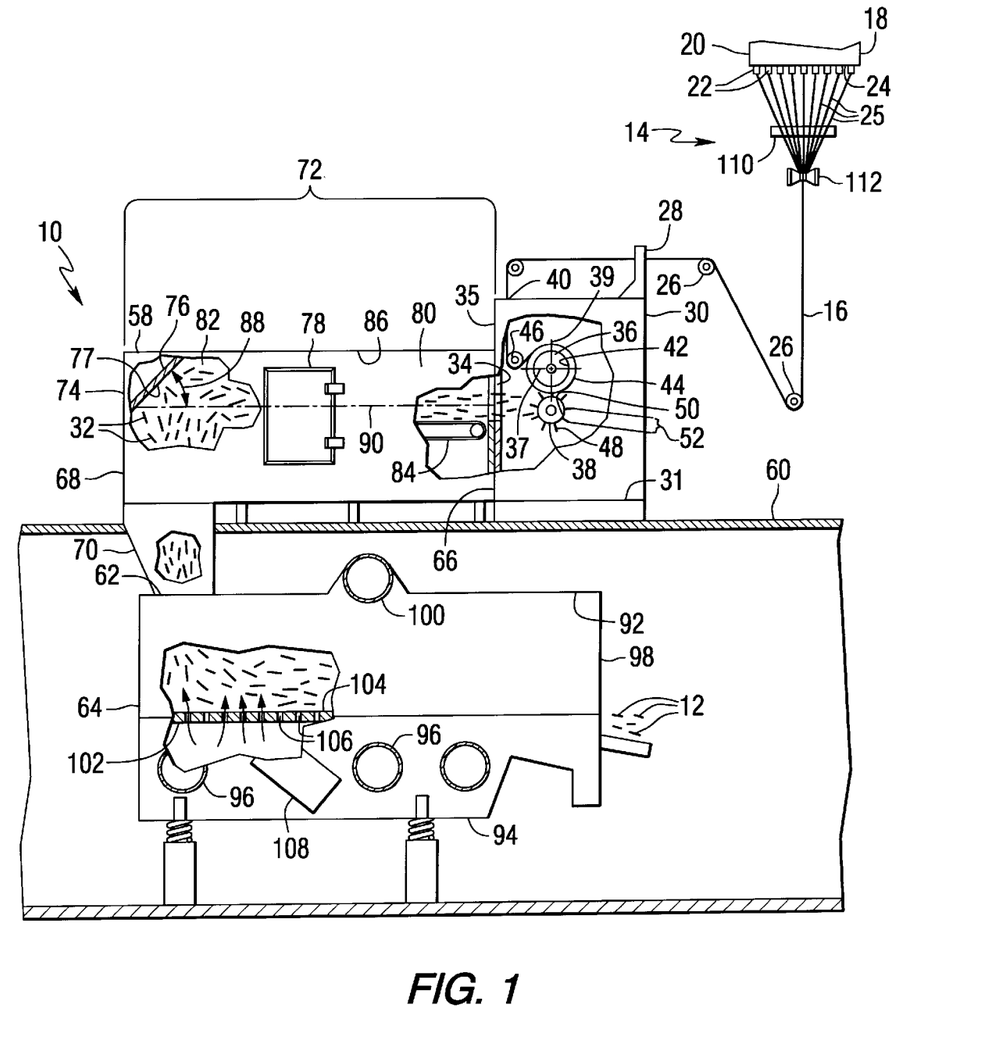
FIG. 1 is a schematic, side elevational view of one embodiment of an apparatus incorporating novel features of the present invention.

Referring now to the drawings, wherein like numerals indicate like elements throughout, there is shown FIG. 1 an apparatus, generally designated 10, for producing dried, chopped strands 12 from a supply (generally designated 14) of generally continuous fiber strand 16.

As used herein, the term "generally continuous fiber strand" means a twisted or untwisted bundle comprising one or more individual filaments having an average length of about 10 to about 150 kilometers or more. The term "chopped strand" means that the strands can have an average length ranging from about 3.2 to about 152.4 millimeters (about 0.125 to about 6 inches). The number of individual filaments in a fiber strand can vary although the number typically ranges from about 50 to about 6000 filaments. The diameters of the individual filaments in the strand can vary but typically range from about 5 microns (designated "D" fiber strand) to about 24 microns (designated "T" fiber strand). If more information on strand and fiber designations is desired, see Loewenstein, (3rd. Ed. 1993) at page 27, which is hereby incorporated by reference.

Continuous fibers stands believed to be useful in the present invention include but are not limited to fiber strands formed from: fiberizable glass compositions (which are preferred), natural organic polymers, synthetic organic polymers, other inorganic, non-glass substances that can be formed into generally continuous filaments and combinations thereof. For more information, see Encyclopedia of Polymer Science and Technology, Vol. 6 at pages 505–712, which are hereby incorporated by reference.

As used herein, the term "fiberizable glass compositions" means glass compositions based upon oxide compositions, such as silicates, selectively modified with other oxide and non-oxide compositions that are formable into generally continuous filaments. Examples of fiberizable glass compositions useful herein include, but are not limited to, "E-glass" (which is preferred), "A-glass", "C-glass", "D-glass", "R-glass", "S-glass", Basalt-glass and E-glass derivatives that contain minor amounts of boron and/or fluorine, and are preferably fluorine-free and/or boron-free. As used herein, "minor amount" means less than about 1 weight percent fluorine and less than about 5 weight percent boron. The formulations for these and other glass compositions are well known to those skilled in the art. If more information is needed, see Loewenstein, (3rd. Ed. 1993) at pages 31–36, which are hereby incorporated by reference.

The supply of generally continuous fiber strand can be provided by one or more creels or carriers containing one or more packages of generally continuous fiber strand. As used herein, the term "package" refers to any package containing a supply of generally continuous fiber strand such as forming packages, roving packages and bobbins. Preferably as shown in FIG. 1, the supply 14 of generally continuous fiber strand 16 is provided by a fiber forming assembly 18 comprising a supply of molten fiberizable material (not shown) and a heated metal bushing 20 having a plurality of apertures 22 or tips located at the bottom wall 24 thereof through which a plurality of individual filaments 25 are attenuated. While, for clarity in the figures, a single fiber forming apparatus and single, generally continuous fiber strand are shown, it will be recognized by one skilled in the art that multiple fiber forming apparatus as well as multiple, generally continuous fiber strands can be used in accordance with the present invention.

As shown in FIG. 1, one or more guide rolls 26 are preferably positioned between the supply 14 of generally continuous fiber strand 16 and the apparatus 10. Guide rollers are typically formed from materials such as brass, graphite, and polyurethane and can have one or more grooves or slots in their surface to maintain the positioning of the generally continuous strand. One or more strand separation devices 28 such as combs and eye boards can also be used to maintain the position of the generally continuous strand 16 during processing.

A non-limiting configuration of a typical chopping assembly believed to be useful in the present invention will now be discussed generally. Such chopping assemblies are well known in the art and commercially available, for example, from Fin and Fram, Pacoima, Calif. Referring now to FIG. 1, the apparatus 10 comprises a chopping assembly 30 for severing or chopping the generally continuous fiber strand 16 to form discrete, wet, chopped strands 32 and ejecting the wet, chopped strands 32 from an exit opening 34 thereof. Preferably, the chopping assembly 30 comprises a rotatably driven drum 36 for feeding the generally continuous fiber strand 16 into the chopping assembly 30 and a rotatable cutter head 38 for severing the generally continuous fiber strand 16 to form the discrete, wet, chopped strands 32. While preferably in the present invention the drum 36 of the chopping assembly 30 is rotatably driven by a motor (not shown) and the cutter head 38 is rotated, in turn, by the drum 36, in other configurations known in the art, the cutter head can be rotatably driven by a motor and the drum rotated, in turn, by the cutter head.

Figure 4:
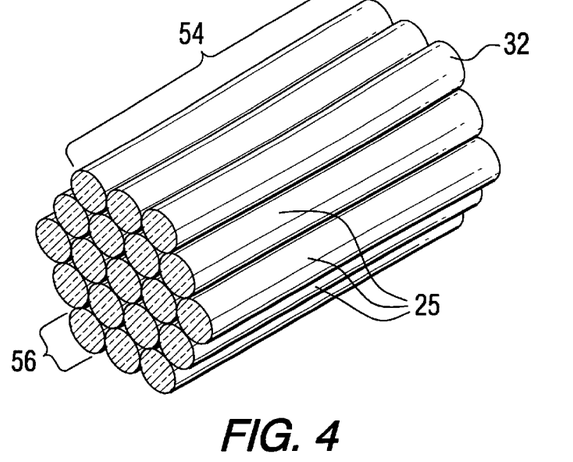
FIG. 4 is a schematic, perspective view of a chopped strand bundle.

When the supply 14 of generally continuous fiber strand 16 is a fiber forming assembly 18, as in the case of direct-chop operations, the rotatably driven drum 36 of the chopping assembly 30 functions to both attenuate the filaments 25 from the bushing 20 of the fiber forming assembly 18 and feed the fiber strand 16 into the chopping assembly 30. It will be recognized by one skilled in the art that the rotational speed and diameter of drum 36 will depend, in part, on the desired diameter 56 (shown in FIG. 4) of the individual filaments 25 of the dried, chopped strands 12 and on the size and configuration of the bushing 20 of the fiber forming assembly 18.

Referring again to FIG. 1, the rotatable drum 36 is positioned adjacent to an entrance opening 40 of the chopping assembly 30 such that an outer surface 42 of the drum 36 is positioned to receive the generally continuous fiber strand 16 from the supply 14. A layer of frictional material 44 is positioned upon the outer surface 42 of the drum 36 to engage the generally continuous fiber strand 16 being feed into the chopping assembly 30. As used herein the term "frictional material" means a material having a coefficient of friction with respect to the surface of the generally continuous fiber strand sufficient to permit the generally continuous fiber strand to be attenuated and/or feed into the chopping assembly. Non-limiting examples materials suitable for use as a frictional layer are rubber and polyurethane. To reduce wear on the layer of frictional material 44, an oscillating guide roller 46 having one more slots therein is preferably located adjacent the drum 36 of the chopping assembly 30 to vary the position of the strand 16 on the outer surface 42 of the drum 36.

As shown in FIG. 1, the rotatable cutter head 38 is positioned adjacent to the drum 36 such that one or more blades 48 protruding from an outer surface 50 of the cutter head 38 are permitted to penetrate into the layer of frictional material 44 positioned upon the outer surface 42 of the drum 36 to sever or chop the generally continuous fiber strand 16 engaged thereon to form a plurality of discrete, chopped strands 32. It will be recognized by one skilled in the art that the position of the cutter head relative to the drum can be varied depending on the location of the exit opening of the chopping assembly. For example, if the exit opening of the chopping assembly is located at a bottom wall 31 of the chopping assembly, the cutter head can be positioned in general alignment with a horizontal axis 37 of the drum such that the chopped strands are ejected from the chopping assembly in a generally vertically downward direction (or "vertically discharged") to pass through the exit opening in the bottom wall of the chopping assembly. Preferably, however, as shown in FIG. 1, the exit opening 34 is located in a side wall 35 of chopping assembly 30 and the cutter head 38 is positioned in general alignment with a vertical axis 39 of the drum 36 such the chopped strands 32 are ejected from the chopping assembly in a generally horizontal direction (or "horizontally discharge") to pass through the exit opening 34 in the side wall 35 of the chopping assembly 30. It will be appreciated by those skilled in the art that configurations of the cutter head and drum wherein the cutter head is off-set with respect to the vertical axis or horizontal axis of the drum can be used in accordance with the present invention, if required, to permit the passage of the chopped strands through the exit opening of the chopping assembly.

The depth of penetration of the blades 48 of the cutter head 38 into the layer of frictional material 44 can be adjusted by increasing or decreasing the spacing between the cutter head 38 and the drum 36. Typically, spacing between the cutter head and the drum is controlled by moving of the cutter head closer to or further from the drum. While the movement of the cutter head can be controlled by any method well known in the art, such as by the application of pressure to the cutter head; preferably, the movement of the cutter head driven by a step motor. It will be recognized by one skilled in the art that the number and pitch 52 (or tip-to-tip spacing) of the blades 48 of the cutter head 38 as well as the rotational speed of the cutter head 38 will depend on the desired length 54 (shown in FIG. 4) of the dried, chopped strands 12 and the rotational speed of the drum 36. The length 54 (shown in FIG. 4) of the dried, chopped strands 12 typical ranges from about 3.2 to about 152.4 millimeters (about 0.125 to about 6 inches) and preferably ranges from about 3.2 to about 25.4 millimeters (about 0.125 to about 1 inch).

Referring back to FIG. 1, a transition chute 58 is interposed between the exit opening 34 of the chopping assembly 30 and an entrance opening 62 of a drying chamber 64 such that at least one of the plurality of discrete, chopped strands 32 ejected form the chopping assembly 30 is guided to pass directly into the drying chamber 64. As used herein, the phrases "pass directly into the drying chamber" and "directly deposited into the drying chamber" mean that the first or initial deposition of the chopped strands ejected from the chopping assembly occurs in the drying chamber. Preferably at least 50 percent, more preferably at least 75 percent, and most preferably at least 85 percent of the wet, chopped strands 32 ejected from the chopping assembly 30 are guided to pass directly into the drying chamber 64. If necessary, a supplemental device can be used to assist with the ejection of the chopped strands from the chopping assembly. A non-limiting example of a supplemental device believed to be suitable for use in the present invention is a forced air blower. For more information on such supplemental devices, see Loewenstein (3rd. Ed. 1993) at page 325, which is hereby incorporated by reference. Some of the chopped strands 32, however, can be deposited in the transition chute 58 prior to reaching the drying chamber 64. Although not required in the present invention, a conveyor belt 84 is preferably disposed within the transition chute 58 to convey to the drying chamber 64 that portion of the chopped strands 32 which did not pass directly into the drying chamber 64 and were deposited within the transition chute 58. Preferably, the conveyor belt 84 extends along the length 72 of the transition chute 58.

The transition chute 58 is preferably formed from an electrically conductive material, such as aluminum or steel, to prevent the build-up of static charge in the transition chute 58. If necessary, a static dissipative device can be used to dissipate static charge in the transition chute or the chute can be grounded. Non-limiting examples of static dissipative devices that are well known in the art are humidifiers, ionized air blowers and static bars.

A first or entrance end 66 of the transition chute 58 can be attached to exit opening 34 of the chopping assembly 30 by any suitable method known in the art. For example, the first end 66 of the transition chute 58 can be permanently attached to the chopping assembly 30 such as by welding or brazing or it can be removably attached such as by bolts or screws. Alternatively, the first end 66 of the transition chute 58 can be positioned adjacent to, and preferably in facing engagement with, the exit opening 34 of the chopping assembly 30 without being attached thereto. If the transition chute 58 is not attached to the chopping assembly 30, preferably both the transition chute 34 and the chopping assembly 30 are attached to the floor 60 by bolts. Although not required, a second or exit end 68 opposite the first end 66 of the transition chute 58 is preferably attached to the entrance opening 62 of the drying chamber 64 by a flexible conduit 70 to withstand the vibration of the drying chamber 64.

Referring again to FIG. 1, the overall length 72 of the transition chute 58 will depend, in part, on the velocity of the chopped strands 32 ejected from the chopping assembly 30. As used herein, the term "velocity of the chopped strands" means the average velocity of the chopped strands ejected from the chopping assembly. The length 72 of the transition chute 58 should be long enough to either allow the velocity of the chopped strands 32 ejected from the chopping assembly 30 to decrease to zero feet per minute upon passing into the drying chamber 64 or permit the velocity of the chopped strands 32 to decrease sufficiently prior to being brought into contact with an end wall 74 of the transition chute 58 or a deflector plate 76 (discussed in detail below) such that the chopped strand bundles remain intact, i.e. the chopped strands 32 are not broken apart or filamentized on impact with the end wall 74 or deflector plate 76. It will be recognized by one skilled in the art that the velocity of the chopped strands ejected from the chopping assembly 30 will depend on the rotational speed of the drum 36 and the cutter head 38. While typically the velocity of the chopped strands ejected from the chopping assembly can range from about 1000 feet per minute (about 5 meters per second) to about 5000 feet per minute (about 25 meters per second), preferably the velocity ranges from about 3500 (about 18 meters per second) feet per minute to about 5000 feet per minute (about 25 meters per second).

Although the transition chute 58 of the present invention can be vibrated to prevent the build of chopped fiber strands or separated filaments on the walls of the chute, preferably the transition chute is essentially stationary. As used herein, the term "essentially stationary" mean that the transition chute is not intentionally vibrated or shaken by a vibration generating device. As shown in FIG. 1, one or more doors 78 can be located in a side wall 80 of transition chute 58 to allow access to the interior 82 of the chute 58 for cleaning or maintenance.

Figure 5:
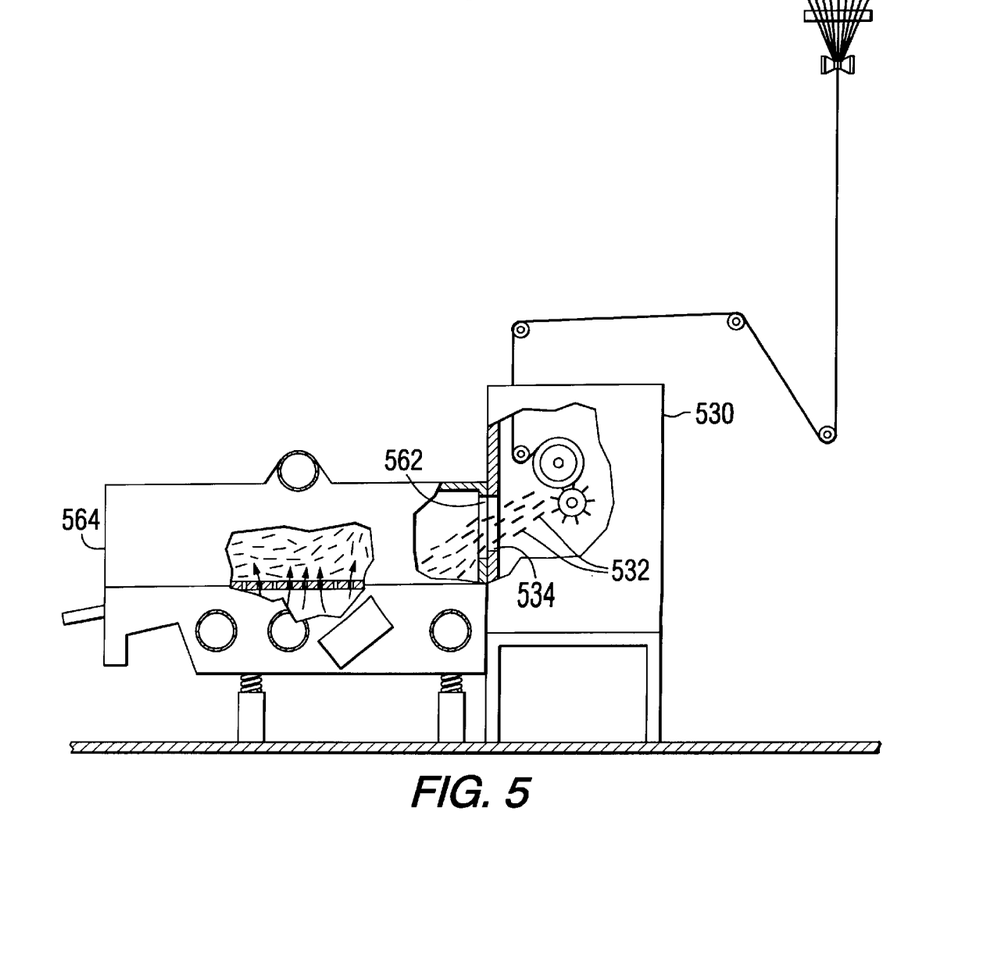
FIG. 5 is a schematic, side elevational view of another embodiment of an apparatus incorporating novel features of the present invention.

While the use of a transition chute such as discussed above and shown in FIGS. 1–3 is preferred in the present invention, in an alternative embodiment shown in FIG. 5, a drying chamber 564 can be positioned adjacent to a chopping assembly 530 such that an entrance opening 562 of the drying chamber 564 is adjacent to, and preferably in facing engagement with, an exit opening 534 of the chopping assembly 530 to permit the direct deposition of at least one of the chopped strands 532 ejected from the chopping assembly 530 into the drying chamber 564 without the need for a transition chute in accordance with the present invention. The drying chamber 564 can be attached to the chopping assembly 530 in a manner similar to those discussed above for attaching the first and second ends of the transition chute to the chopping assembly and the drying chamber respectively, or the drying chamber 564 can be positioned adjacent the chopping assembly 530 without being attached thereto.

Referring again to FIG. 1, a deflector plate 76 is preferably spaced apart from the exit opening 34 of the chopping assembly 30 and positioned to divert at least one of the chopped strands 32 ejected from the chopping assembly 30 into the drying chamber 64. While preferably the deflector plate 76 is adjustable and from a flat plate, if desired, the deflector plate of the present invention can be shaped to have a radius or any other desired configuration. Preferably, the deflector plate 76 is formed from a metal such as stainless steel or aluminum and has a layer of a release coating material to which the wet, chopped strands and filamentized materials do not readily adhere positioned upon an inner surface 77 thereof to prevent the build up of chopped strands and filamentized materials thereon. Examples of such materials include but are not limited to graphite, boron nitride and polytetrafluoroethylene. A non-limiting example of a preferred release coating material is PC215 which is a plasma sprayed metal coating containing a release polymer that is commercially available from Plasma Coatings Inc., Memphis, Tenn.

It will be recognized by one skilled in the art that the placement and orientation of the deflector plate 76 will depend on several factors including the velocity of the chopped strands 32 ejected from the chopping assembly, the length 72 of the transition chute 58 and the configuration and relative location of the chopping assembly 30, drying chamber 64 and transition chute 58. For example, in one embodiment of the present invention shown in FIG. 1, the deflector plate 76 is attached to a top wall 86 of the transition chute 58 and oriented at an angle 88 with respect to a longitudinal axis 90 of transition chute 58 to divert at least one of the chopped strands 32 ejected from the chopping assembly 30 into the drying chamber 64. In another embodiment of the present invention shown in FIG. 2, an end wall 274 of the transition chute 258 is inclined at an angle 288 with respect to a longitudinal axis 290 of transition chute 258 to divert at least one of the chopped strands 232 ejected from the chopping assembly 230 into the drying chamber 264 in a manner similar to deflector plate 76 shown in FIG. 1. In yet another embodiment of the present invention shown in FIG. 3, a deflector plate 376 is attached to a top wall 392 of the drying chamber 364 and oriented at an angle 388 with respect to a longitudinal axis 390 of transition chute 358 to divert at least one of the chopped strands 332 ejected from the chopping assembly 330 into the drying chamber 364. The angles 88, 288, 388 generally range from about 30 degrees to about 90 degrees and preferably range from about 30 degrees to about 60 degrees.

Figure 6:
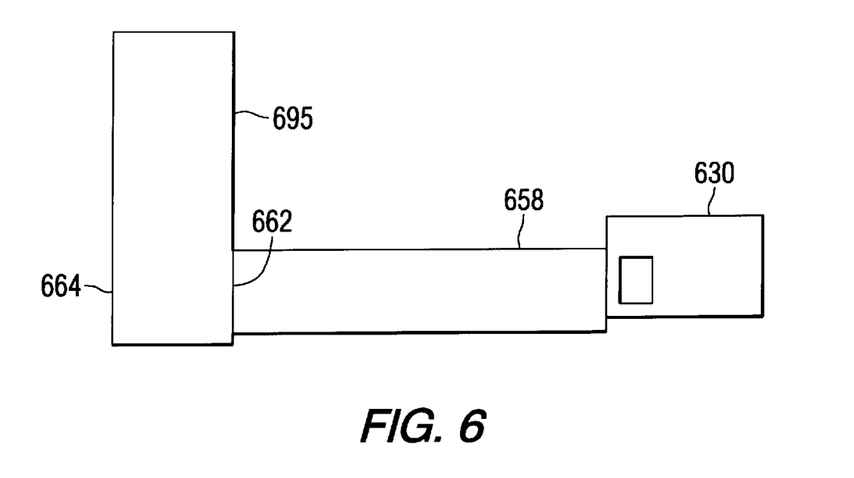
FIG. 6 is a schematic, plan view of another embodiment of an apparatus incorporating novel features of the present invention.

Referring to FIG. 1, the apparatus 10 of the present invention comprises drying chamber 64 for at least partially drying the wet, chopped fiber strands 32 ejected from the chopping assembly 30. As discussed in detail above, the drying chamber 64 is connected with the chopping assembly 30 via the transition chute 58 which is interposed between the exit opening 34 of chopping assembly 30 and the entrance opening 62 of drying chamber 64. Wet, chopped fiber strands 32 ejected from the chopping assembly 30 pass through the transition chute 58 and directly into the drying chamber 64. The location of the entrance opening 62 of the drying chamber 64 will depend on the type and configuration of the drying chamber 64. For example, in one configuration, shown in FIG. 1, the drying chamber 64 connected to chopping assembly 30 by transition chute 58 is "top-loading" wherein the entrance opening 62 of the drying chamber 64 is located at a top wall 92 of the drying chamber 64. In another configuration, shown in FIG. 3, the drying chamber 364 connected to chopping assembly 330 by transition chute 358 is "end-loading" wherein the entrance opening 362 of the drying chamber 364 is located at an end wall 393 of the drying chamber 364. In yet another configuration, shown in FIG. 6, the drying chamber 664 connected to chopping assembly 630 by transition chute 658 is "side-loading" wherein the entrance opening 662 of the drying chamber 664 is located at a side wall 695 of the drying chamber 364.

Figure 2:
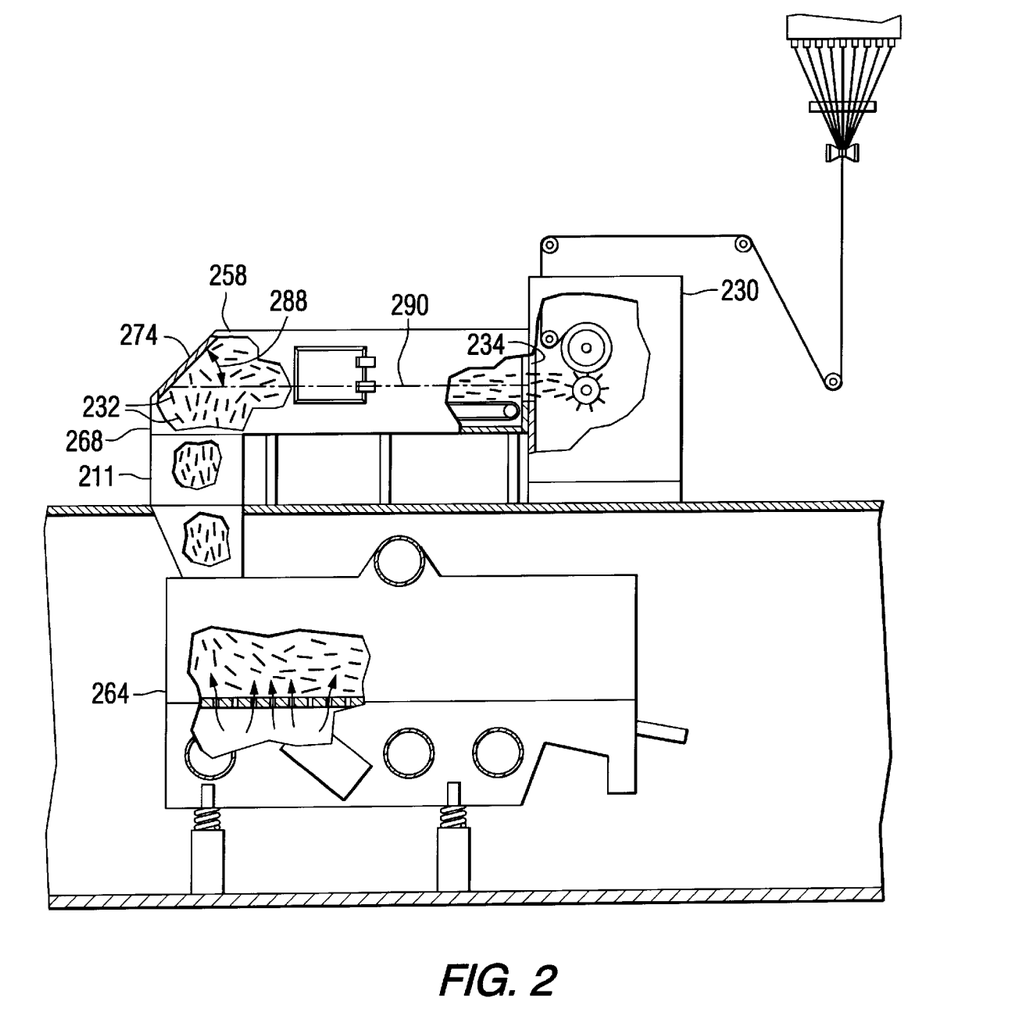
FIG. 2 is a schematic, side elevational view of another embodiment of an apparatus incorporating novel features of the present invention.
Figure 3:
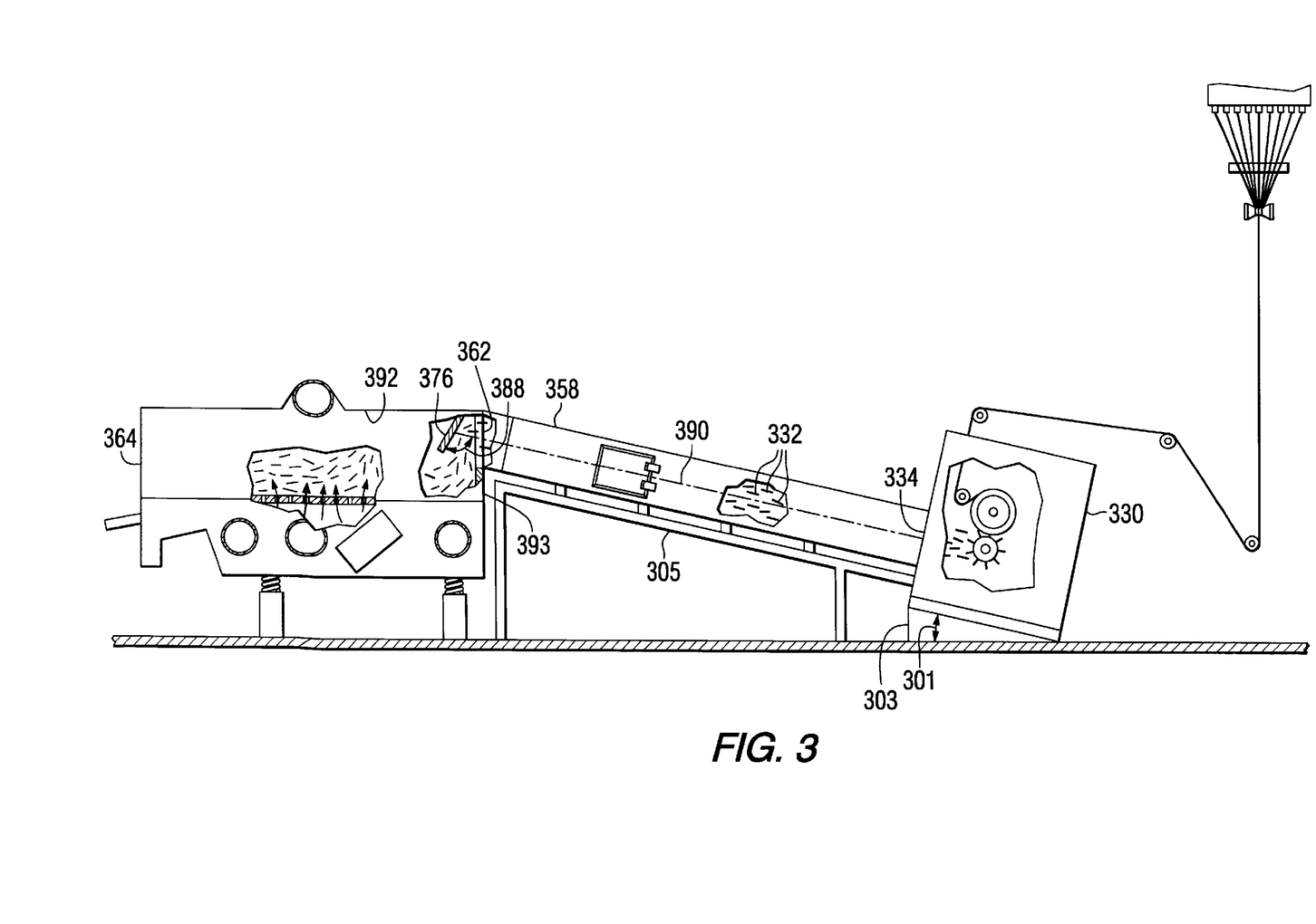
FIG. 3 is a schematic, side elevational view of another embodiment of an apparatus incorporating novel features of the present invention.

It will be recognized by one skilled in the art that the configuration and orientation of the transition chute will vary depending on the location of the entrance opening of the drying chamber and the exit opening of the chopping assembly. For example, as shown in FIG. 2, one or more secondary chutes 211 can be attached to the transition chute 258 if required to permit the direct deposition of the ejected chopped strands 232 into the drying chamber 264 or, as shown in FIG. 3, the transition chute 358 can be tilted to permit the direct deposition of the ejected chopped strands into the drying chamber. Although in FIG. 3 the transition chute is declined with respect to the entrance opening of the drying chamber, the transition chute can be inclined if necessary to permit the direct deposition into the drying chamber.

Figure 7:
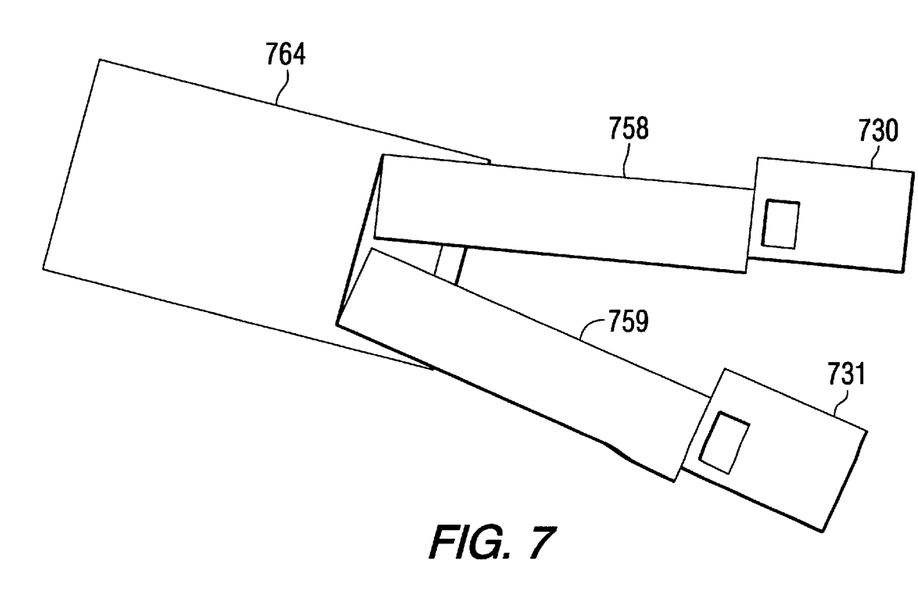
FIG. 7 is a schematic, plan view of another embodiment of an apparatus incorporating novel features of the present invention.

While a single chopping assembly 30 connected with a single drying chamber 64 by a single transition chute 58 is shown in FIG. 1, it will be recognized by one skilled in the art that multiple chopping assemblies can be connected with a single drying chamber by multiple transition chutes in accordance with the present invention. For example, in a particular embodiment shown in FIG. 7, two chopping assemblies 730, 731 provide wet, chopped strands to a single drying chamber 764 through two separate transition chutes 758, 759, respectively.

The drying chamber of the present invention can be any continuous or batch type dryer known to one skilled in the art. Examples of dyers suitable for use in the present invention include but are not limited to electric, gas, infrared, ultraviolet, dielectric, microwave or fluidized bed dryers. Preferably, as shown in FIG. 1, the drying chamber 64 of the present invention is a fluidized bed dryer comprising a lower portion 94 having one or more hot air inlets 96 positioned therein, an upper portion 98 having one or more exhaust outlets 100 positioned therein, and a dryer bed 102 for supporting the chopped strands 32 received from the chopping assembly 30 positioned between the lower and upper portions 94, 98 of the drying chamber 64.

Referring again to FIG. 1, the dryer bed 102 comprises a plate 104 having a plurality of perforations 106 extending therethrough to permit the flow of hot gas received from the one or more hot gas inlets 96 positioned in the lower portion 94 of the drying chamber 64 through the dryer bed 102 and the one or more exhaust outlets 100 positioned in the upper portion 98 of the drying chamber 64 to dry the chopped strands 32. Preferably, the density of perforations 106 in the plate 104 ranges from about 300 perforations per square foot to about 400 perforations per square foot and the perforations 106 have a diameter of about 0.1 inches (0.25 centimeters). A coating material having a low coefficient of friction with the surface the chopped strands can be applied to the plate 104 of the dryer bed 102 to prevent sticking of the strands 32 to the plate 104 during drying. Examples of suitable coating materials include graphite, boron nitride and polytetrafluoroethylene.

Hot air exhausted from the exhaust 100 in the upper portion 98 of the drying chamber 64 is preferably ducted to flow through a filtration or scrubbing device (not shown) prior to being exhausted to the atmosphere. The scrubbing device removes particulates and filaments formed during processing of the chopped strands from the air. While not preferred, if desired hot air exhausted from the upper portion of the drying chamber can be ducted to flow back into the drying chamber by a recirculation device of a type well known in the art.

Referring to FIG. 1, drying chamber 64 can also include a vibration generating device 108 for vibrating the drying chamber 64 to assist in moving the chopped strands 32 through the drying chamber 64 and prevent agglomeration of the chopped strands 32 during the drying process. Examples of suitable vibration generating devices 108 include but are not limited to mechanical vibrating devices and electromagnetic vibrating devices.

The operation of an apparatus for forming dried, chopped strands from a supply of generally continuous fiber strands will now be described generally. Referring to FIG. 1, individual filaments 25 are formed from streams of molten fiberizable material attenuated through a plurality of apertures 22 at the bottom wall 24 of bushing 20 by rotating drum 36 of chopping assembly 30. A sizing composition is applied to at least a portion of the surface of the individual filaments 25 by applicator 110 prior to gathering the filaments 25 together with gathering device 112 to form a single, generally continuous fiber strand 16. Strand 16 is then guided by a series of guide rollers 26 into chopping assembly 30 where it is engaged on a layer of frictional material 44 positioned on the outer surface 42 of drum 36 of the chopping assembly 30. The rotation of drum 36 feeds strand 16 into the chopping assembly 30. An oscillating guide roller 46 positioned adjacent drum 36 of the chopping assembly 30 varies the position of strand 16 on the outer surface 42 of drum 36 as the strand 16 is feed into chopping assembly 30. The fiber strand 16 is then severed to form a plurality of discrete, chopped strands 32 by one or more blades 48 protruding from an outer surface 50 of a rotating cutter head 38 positioned adjacent drum 36. After being formed, the discrete, chopped strands 32 are ejected from exit opening 34 of chopping assembly 30 due to the rotation of drum 36 and cutter head 38. The ejected, chopped strands 32 pass through transition chute 58 positioned between exit opening 34 of chopping assembly 30 and entrance opening 62 of drying chamber 64 and are directly deposited into the drying chamber 64. As discussed above, a deflector plate 76 is preferably spaced apart from the exit opening 34 of the chopping assembly 30 to divert the chopped strands 32 into the drying chamber 64. Preferably, at least 50 percent of the chopped strand 32 ejected from chopping assembly 30 are guided to pass directly into drying chamber 64. Chopped strands 32 that do not pass directly into drying chamber 64 are collected on a conveyor belt 84 and conveyed to the end of the transition chute 58 and deposited into the drying chamber 64. Preferably, drying chamber 64 is vibrated during drying to move the strands through the drying chamber, prevent agglomeration and enhance the drying process. The dried, chopped strands 12 are then removed from drying chamber 64.

A method of forming dried, chopped fiber strands from a supply of fiber strand according to the present invention will now be discussed generally. Referring to FIG. 1, the method comprises the initial step of providing a supply 14 of generally continuous fiber strand 16 to a chopping assembly 30. As discussed in detail above, preferably the supply 14 comprises a fiber forming apparatus 18 comprising a bushing 20 and a supply of molten fiberizable material (not shown). The generally continuous fiber strand 16 is fed from the supply 14 into the chopping assembly 30 where the strand 16 is severed to form a plurality of discrete, wet, chopped fiber strands 32. The chopped strands 32 are then ejected from an exit opening 34 of the chopping assembly 30 such that the strands 32 pass through a transition chute 58 and directly into a drying chamber 64 where they are collected and dried.

The apparatus and method for forming dried, chopped strands of the present invention will now be illustrated by the following specific, non-limiting example.

EXAMPLE

An apparatus for producing dry, chopped strands according to the present invention and shown schematically in FIG. 2 was used to produce dry, chopped strands of from a supply of continuous fiber strands.

Four generally continuous fiber strands each comprising approximately 6000 generally continuous individual filaments having an average diameter of approximately 0.00039 inches (about 0.001 centimeters) were supplied to a single chopping assembly from four separate fiber forming assemblies.

The strands were passed over a series of guide rollers and were fed into a chopping assembly by a rotatably driven drum having a layer of polyurethane ranging in thickness from about 0.5 to about 1.0 inch (about 1.27 to about 2.54 centimeters) positioned upon an outer surface thereof to engage the generally continuous fiber strands. The diameter of the drum was approximately 13 inches (about 33 centimeters). The drum was rotated such that the surface speed of the drum was about 3500 feet per minute about (17.8 meters per second).

A cutter head having a diameter of approximately 3.4 inches (about 8.6 centimeters) and about 120 blades spaced at a tip-to-tip distance of approximately 0.125 inches (about 0.32 centimeters) and protruding about from about 0.070 to about 0.075 inches from an outer surface of the cutter head, was positioned adjacent the drum in general alignment with a vertical axis of the drum. The distance between the cutter head and drum was controlled to permit the blades of the cutter head to penetrate approximately 1 millimeter (about 0.04 inches) into the layer of polyurethane on the outer surface of the drum. The cutter head was rotated by the drum such that the surface speed of the cutter head was approximately 3500 feet per minute (about 17.8 meters per second).

The generally continuous fiber strands engaged on the outer surface of the drum were severed by the blades of the cutter head as they penetrated into the polyurethane layer on the outer surface of the drum to form a plurality of discrete chopped strands having an average chop length of approximately 0.125 inches (0.32 centimeters). The chopped strands were then ejected from the chopping assembly at an average velocity of about 3500–3600 feet per minute (about 17.8 to about 18.3 meters per second).

The chopped strands ejected from the exit opening positioned in a side wall of the chopping assembly passed through a transition chute and directly into a fluidized bed drying chamber (commercially available from Carman Industries, Jeffersonville, Ind.). The transition chute was formed from stainless steel and had a length of approximately 14 feet (about 4.3 meters), a width of approximately 1 foot (about 0.3 meters) and a height of approximately 15 inches (about 38 centimeters).

An uncoated deflector plate was located approximately 14 feet (about 4.3 meters) from the exit opening of the chopping assembly (at the end of the transition chute) and inclined at an angle of about 45° with respect to a longitudinal axis of the transition chute. The deflector plate was positioned to divert the chopped strands directly into the drying chamber. Approximately 75 percent of the chopped strands ejected from the chopping assembly were passed directly into the drying chamber. A conveyor belt located within the transition chute conveyed approximately 25 percent of the chopped strands ejected from the chopping assembly that did not pass directly into the drying chamber to the end of the transition chute and deposited the strands into the drying chamber.

The chopped strands were then dried in the drying chamber to produce dried, chopped strands.

It will be appreciated by those skilled in the art that changes could be made to the embodiments described above without departing from the broad inventive concept thereof. It is understood, therefore, that this invention is not limited to the particular embodiments disclosed, but is intended to cover modifications which are within the spirit and scope of the invention, as defined by the appended claims.

Therefore, we claim:

1. An apparatus for producing dried, chopped strands from a supply of generally continuous fiber strands, the apparatus comprising:

(a) a chopping assembly for severing one or more generally continuous fiber strands to form chopped strands and ejecting the chopped strands from an exit opening thereof;

(b) a drying chamber for receiving the chopped strands ejected from the exit opening of the chopping assembly and at least partially drying the chopped strands; and (c) a transition chute interposed between the exit opening of the chopping assembly and an entrance opening of the drying chamber such that at least one of the chopped strands ejected from the chopping assembly is guided through and initially deposited in the drying chamber.

2. The apparatus according to claim 1 wherein the chopped strands ejected from the chopping assembly have an average velocity ranging from about 3600 feet per minute to about 5000 feet per minute.

3. The apparatus according to claim 1 wherein the entrance opening of the drying chamber is positioned in a top wall of the drying chamber.

4. The apparatus according to claim 1 wherein the entrance opening of the drying chamber is positioned in a side wall of the drying chamber.

5. The apparatus according to claim 1 wherein the entrance opening of the drying chamber is positioned in an end wall of the drying chamber.

6. The apparatus according to claim 1 wherein the transition chute is essentially stationary.

7. The apparatus according to claim 1 wherein the transition chute includes a vibration generating device.

8. The apparatus according to claim 1 wherein at least 50 percent of the chopped strands ejected from the chopping assembly are initially deposited in the drying chamber.

9. The apparatus according to claim 8 wherein at least 75 percent of the chopped strands ejected from the chopping assembly are initially deposited in the drying chamber.

10. The apparatus according to claim 9 wherein at least 85 percent of the chopped strands ejected from the chopping assembly are initially deposited in the drying chamber.

11. The apparatus according to claim 1 further comprising a deflector plate spaced apart from the exit opening of the chopping assembly and angled with respect to a longitudinal axis of the transition chute to divert at least one of the chopped strands ejected from the chopping assembly into the drying chamber.

12. The apparatus according to claim 11 wherein the angle of the deflector plate with respect to the longitudinal axis of the transition chute ranges about 30 degrees to about 60 degrees.

13. The apparatus according to claim 11 wherein a layer of release coating material is positioned upon an inner surface of the deflector plate.

14. The apparatus according to claim 11 wherein the deflector plate is located within the transition chute.

15. The apparatus according to claim 11 wherein the deflector plate is located within the drying chamber.

16. The apparatus according to claim 1 wherein the transition chute further comprises a conveyor belt disposed therein to convey at least one of the chopped strands ejected from the chopping assembly to the drying chamber.

17. The apparatus according to claim 1 further comprising a supply of generally continuous fiber strands.

18. The apparatus according to claim 17 wherein the supply of generally continuous fiber strands is provided by a fiber forming assembly comprising a supply of fiberizable material and a bushing.

19. The apparatus according to claim 18 wherein the fiberizable material is glass.

20. The apparatus according to claim 1 further comprising a second chopping assembly for severing one or more generally continuous fiber strands to form chopped strands and ejecting the chopped strands from an exit opening thereof, connected to the drying chamber by a second transition chute interposed between the exit opening of the second chopping assembly and an entrance opening of the drying chamber such that at least one of the chopped strands ejected from the second chopping assembly is guided through and initially deposited in the drying chamber.

21. An apparatus for producing dried, chopped strands from a supply of generally continuous fiber strands, the apparatus comprising:
  (a) a chopping assembly for severing one or more generally continuous fiber strands to form chopped strands and ejecting the chopped strands from an exit opening thereof; and
  (b) a drying chamber for at least partially drying the chopped strands ejected from the chopping assembly positioned adjacent to the chopping assembly such that an entrance opening of the drying chamber is adjacent to the exit opening of the chopping assembly to permit the initial deposition of at least one of the chopped strands ejected from the chopping assembly in the drying chamber.

22. The apparatus according to claim 21 wherein the drying chamber is positioned adjacent to the chopping assembly such that an entrance opening of the drying chamber is in facing engagement with the exit opening of the chopping assembly.

23. A method of forming dried, chopped fiber strands from a one or more generally continuous fiber strands comprising the steps of:
  (a) providing one or more generally continuous fiber strands to a chopping assembly;
  (b) feeding the one or more generally continuous fiber strands into the chopping assembly;
  (c) severing the one or more generally continuous fiber strands to form chopped strands;
  (d) ejecting the chopped strands from an exit opening of the chopping assembly such that at least one of the chopped strands passes through a transition chute and is initially deposited in a drying chamber;
  (e) collecting the chopped strands in the drying chamber; and
  (f) at least partially drying the chopped strands in the drying chamber.

24. The method according to claim 23 wherein at least 85 percent of the chopped strands ejected from the chopping assembly is initially deposited in the drying chamber.

25. The method according to claim 23 wherein the drying chamber further comprises a deflector plate spaced apart from the exit opening of the chopping assembly and angled with respect to a longitudinal axis of the transition chute to divert at least one of the chopped strands ejected from the chopping assembly into the drying chamber.

26. The method according to claim 23 wherein the transition chute further comprises a deflector plate spaced apart from the exit opening of the chopping assembly and angled with respect to a longitudinal axis of the transition chute to divert at least one of the chopped strands ejected from the chopping assembly into the drying chamber.

27. The method according to claim 23 wherein the transition chute further comprises a conveyor belt disposed therein to convey at least one of the chopped strands ejected from the chopping assembly to the drying chamber.

* * * * *